(12) United States Patent
Kirby (10) Patent No.: US 7,536,033 B2
(45) Date of Patent: May 19, 2009

(54) PORTABLE SWING ANALYZER

(76) Inventor: Richard Albert Kirby, 112 Allee des Chanterelles, St. Martin d'Uriage (FR) 38410

( * ) Notice: Subject to any disclaimer, the term of this patent is extended or adjusted under 35 U.S.C. 154(b) by 690 days.

(21) Appl. No.: 11/308,025

(22) Filed: Mar. 3, 2006

(65) Prior Publication Data
US 2007/0206837 A1 Sep. 6, 2007

(51) Int. Cl.
*G06K 9/00* (2006.01)
(52) U.S. Cl. ........................................ 382/107
(58) Field of Classification Search ............. 382/103, 382/107, 209
See application file for complete search history.

(56) References Cited

U.S. PATENT DOCUMENTS

| 2,787,470 A | 4/1957 | Barrus |
| 3,070,373 A | 12/1962 | Mathews |
| 3,191,939 A | 6/1965 | Hooper |
| 3,820,795 A | 6/1974 | Taylor |
| 3,863,933 A | 2/1975 | Tredway |
| 6,139,442 A | 10/2000 | Wilson |
| 7,091,960 B1 * | 8/2006 | Silverbrook et al. ........ 345/173 |
| 7,298,919 B2 * | 11/2007 | Ejiri et al. .................... 382/284 |
| 2002/0123384 A1 | 9/2002 | Shearer et al. |
| 2003/0207718 A1 | 11/2003 | Perlmutter |
| 2006/0023970 A1 * | 2/2006 | Wang ........................ 382/312 |

* cited by examiner

*Primary Examiner*—Tom Y Lu (57) ABSTRACT

The present disclosure is directed to apparatus and methods for analyzing the motion of sporting equipment, such as a golf club, a baseball bat, a hockey stick, or a tennis racquet. The apparatus comprises an imaging system in communications with the sporting equipment to measure motion parameters. The imaging system may be located on the sporting equipment or, optionally, within the sporting equipment. The systems and methods described herein can be used to determine the impact location of the sporting equipment with another object, the momentum transferred, the velocity of the sporting equipment and/or the angular orientation of the sporting equipment during a motion.

20 Claims, 5 Drawing Sheets

```
Club head speed = 160 km/hr
Initial ball speed = 240 km/hr
Club head angle = 4° open
Rotational velocity = 3.2°/min
Sweat spot offset = 3.7 cm outside
```

PORTABLE SWING ANALYZER

FEDERALLY SPONSORED RESEARCH

Not applicable.

CROSS-REFERENCE TO RELATED APPLICATIONS

Not applicable.

SEQUENCE LISTING OR PROGRAM

Not applicable.

BACKGROUND OF THE INVENTION

1. Field of Invention

This invention relates to sports equipment, specifically to a portable swing analyzer for golf, tennis, baseball, hockey, etc.

2. Prior Art

Golf, baseball, tennis, and hockey are popular sports, which require subtle control over the three-dimension motion of the club, bat, racket, or stick as it contacts the ball or puck. Improvements in performance in these sports require subtle improvement in technique while increasing the force at which the club, bat, racket, or stick contacts the ball or puck. These improvements are typically made in a haphazard, often frustrating, trial and error process because of the lack of qualitative feedback that tells the athlete what he or she is not doing correctly. Real-time quantitative feedback that aids the athlete pinpoint technique weaknesses is very difficult or impossible to obtain.

Good golfers have learned to control the angle of the clubface, the speed of the club head, and the location on the clubface where it contacts the golf ball to attain the results they are looking for. This effect could be a straight shot, a fade or a draw. For a less experienced golfer, this could also include a hook or slice which may send the ball in an unpredictable direction. The same basic principles of three-dimensional control are true for batters, tennis players, and hockey players.

Because of the difficulties that many golfers have in developing a correct swing, several devices that analyze the golf swing have been devised. These devices fall into two broad categories: devices external to the club and devices mounted on or in the club.

The first category of devices analyzes golf swings through the use of specially designed motion sensing apparatuses external to the club. External devices are limited to certain types of practice as it is not possible to carry the device onto a golf course while playing a round. Many also have other limitations related to processing speed, video frame rates, or limited to certain dimensions in order to avoid interfering with the movement of the club. Some of these devices cannot be used with a real golf ball.

The second category, devices attached to the club, can be further divided into visual aids and sensor based measurement systems.

Visual aids are described in a number of patents, such as U.S. Pat. No. 6,139,442 to Wilson, U.S. Pat. No. 3,191,939 to Hooper, and U.S. Pat. No. 2,787,470 to Barrus et al. These visual aids help the golfer "see" the club head movement. This type of analyzer provides a qualitative instantaneous image that can distract the golfer and gives no concrete data as to what is happening to the club head at the moment it contacts the ball.

Other types of visual aids are described in U.S. Pat. No. 3,070,373 to Mathews et al., U.S. Pat. No. 3,820,795 to Taylor and U.S. Pat. No. 3,863,933 to Tredway disclose devices that are attached to the shaft or hosel of a golf club. These devices indicate the path of the swing, not the angle of the clubface.

Sensor based systems that use accelerometers, gyroscopes, angular rate sensors or a combination of the three are described in numerous patent applications including U.S. Pat. Application No. 20020123386 to Shearer et al. and U.S. Pat. Application No. 20030207718 to Perlmutter. While these devices can provide a quantitative measure of performance, systems based on accelerometers, gyroscopes, and/or angular rate sensors, have two serious defects. First, they require exact angular alignment between the sensors and the face of the club and exact positional alignment of the sensors relative to the contact point with the ball. For example, to be able to measure the angle of the clubface relative to the arc of the swing, the sensors need to be aligned precisely with the clubface. This works if the sensors are built into the club head during the manufacturing process, but becomes extremely problematic if the golfer is expected to do the alignment him or herself. In all cases, it is unrealistic to expect a device that requires this type of alignment to be transportable between clubs during a round of golf making it prohibitively expensive to outfit a set of clubs.

Second, accelerometers, gyroscopes, and/or angular rate sensors are all analogue devices. In order to analyze and process the data, the analogue information (usually a voltage or resistance) needs to be latched and then converted to a digital level that can be analyzed by a microprocessor. This latching and conversion process is slow. In golf, with club head speeds as high as 250 km/hr, the contact time between the club head and the ball can be as short as 100 uS. The high-speed accelerometers of today are capable of 800 Hz sample rates, 1,250 uS between samples, for three axis units and cost many hundreds of dollars each. This speed can be increased to 2 KHz by using three independent accelerometers, but this triples the already prohibitive price.

All of the existing portable swing analyzers suffer from one or more of the following disadvantages:

Visual aid swing analyzers do not provide quantitative data, they do not record any characteristics of the swing and thus provide no way of comparing one swing to another to identify what is right or wrong, what can be improved, or if improvement is actually occurring. In addition, visual aid swing analyzers can distract the golfer and require reasonably accurate alignment in order to be effective.

Devices based on the collection of analogue data (accelerometers, gyroscopes, or angular motion sensors), are too slow to detect what happens in 100 uS or so that the club head is in contact with the ball and are prohibitively expensive.

A device based on accelerometers, gyroscopes, or angular motion sensors, requires precision alignment with clubface or in the case of a baseball bat, with the batters hands. This precision alignment requires a high level of skill and special tools and takes a non-trivial amount of time. Keeping the device aligned can be a challenge because most sporting equipment is subject to a certain amount of abuse. This alignment issue makes it unrealistic to move devices based on accelerometers, gyroscopes or angular motion sensors from one club to another during a match.

To avoid the alignment issue, sensors can be built into the piece of sporting equipment. This substantially increases costs, particularly in golf, where it is not uncommon to have 10 or more clubs. In addition, sensors built into the sporting equipment can be a detriment to the correct feeling of the piece of equipment. Lastly, monitoring the batteries in 10 or more golf clubs is a significant burden for the golfer.

External swing analyzers are large and not portable enough to be used while playing a match. In addition, they tend to be very expensive or suffer from issues with processing speed, video frame rate, or lack of analysis related to motion in certain dimensions.

While external swing analyzers and visual aids are both capable of providing real-time technique improving feedback, no portable sensor based swing analyzers are known of today that provide real-time technique improving feedback.

3. Objects and Advantages

Accordingly, several objects and advantages of the present invention are:

- to provide a swing analyzer for golf, tennis, baseball, hockey or similar sport that measures and records all quantitative data important to the athlete relative to the movement of the club, racket, bat, hockey stick or other similar piece of swinging sporting equipment.
- to provide a swing analyzer that transfers all recorded data to a computer for in-depth analysis and visualization.
- to provide a swing analyzer that is sufficiently fast to capture the contact between the club and the ball while maintaining a low price point.
- to provide a swing analyzer which is self aligning.
- to provide a swing analyzer which can be transported from one piece of sporting equipment to another and realign itself automatically.
- to provide a swing analyzer, which has all the functionality of external swing analyzers, but in a lightweight, portable and low cost package.
- to provide a portable device which provides quantitative real-time performance enhancing feedback audibly and/or visually during and immediately after the stroke.

Further objects and advantages will become apparent from a consideration of the drawings and ensuing description.

SUMMARY

In accordance with the present invention a portable swing analysis system for golf, tennis, baseball, hockey or similar sport comprising at least one light sensitive pixel array attached to the golf club, tennis racket, bat, hockey stick or similar sporting equipment, the light sensitive pixel array providing sequential images of the background to an image processing system capable of measuring displacement between sequential images such that the movement of the sporting device relative to the background can be determined.

BRIEF DESCRIPTION OF THE SEVERAL VIEWS OF THE DRAWINGS

In the drawings, clearly related figures have the same number with different suffixes.

DRAWING—REFERENCE NUMBERS

10 Golf club shaft
12 Grip
14 Golf club head
16 Portable swing analyzer
18 Attachment mechanism
20 Club face
22 LCD Display
24 Input buttons
26 Microprocessor (or other means of interpreting displacement vector from imaging sensor)
28 Waterproof housing
30 Imaging lenses
32 Transceiver
34 Printed Circuit Board
36 Imaging sensor
38 Surface on which the ball lies
40 Power supply
42 Output device (means of communicating to user)
44 Input device (means of getting information from user)
46 Gray scale common pixel pattern
50 Anomaly pixel
52 Sequential image frame taken at time n
54 Sequential image frame taken at time n+q
56 Displacement vector
58 X component of the displacement vector
60 Y component of the displacement vector
62 Top and front view of lower club and club face
64 Golf ball
68 Direction of motion of the club head.
70 Club head speed perpendicular to club face
72 Club head speed parallel to club face
74 Club face angle relative to arc of swing graph
76 Rapid loss of club head speed
78 Pixel representing the left side of the club face edge from the top
80 Pixel representing the right side of the club face edge from the top
82 Coordinate system of image sensor
84 Coordinate system of golf club face
86 User configuration subroutine
88 Firmware alignment detection subroutine
90 Firmware auto-alignment subroutine
92 Swing input subroutine
94 Sampling rate controller
96 Sensor sampling subroutine
98 Recording subroutine
100 Head angle and audible feedback computations
102 Rapid speed lose detection
104 Head angle, speeds, rotational velocity and sweat spot offset computations
106 LCD display update routine
108 Feedback lock routine
110 Photo sensitive pixel array (means of taking sequential images)
112 Image processor (means of identifying common patterns between sequential images and calculating a displacement vector based on the movement of the common pattern)

114 Analog sensor such as an accelerometer, gyroscope, angular velocity sensor, range finder, etc.

Figure 1:
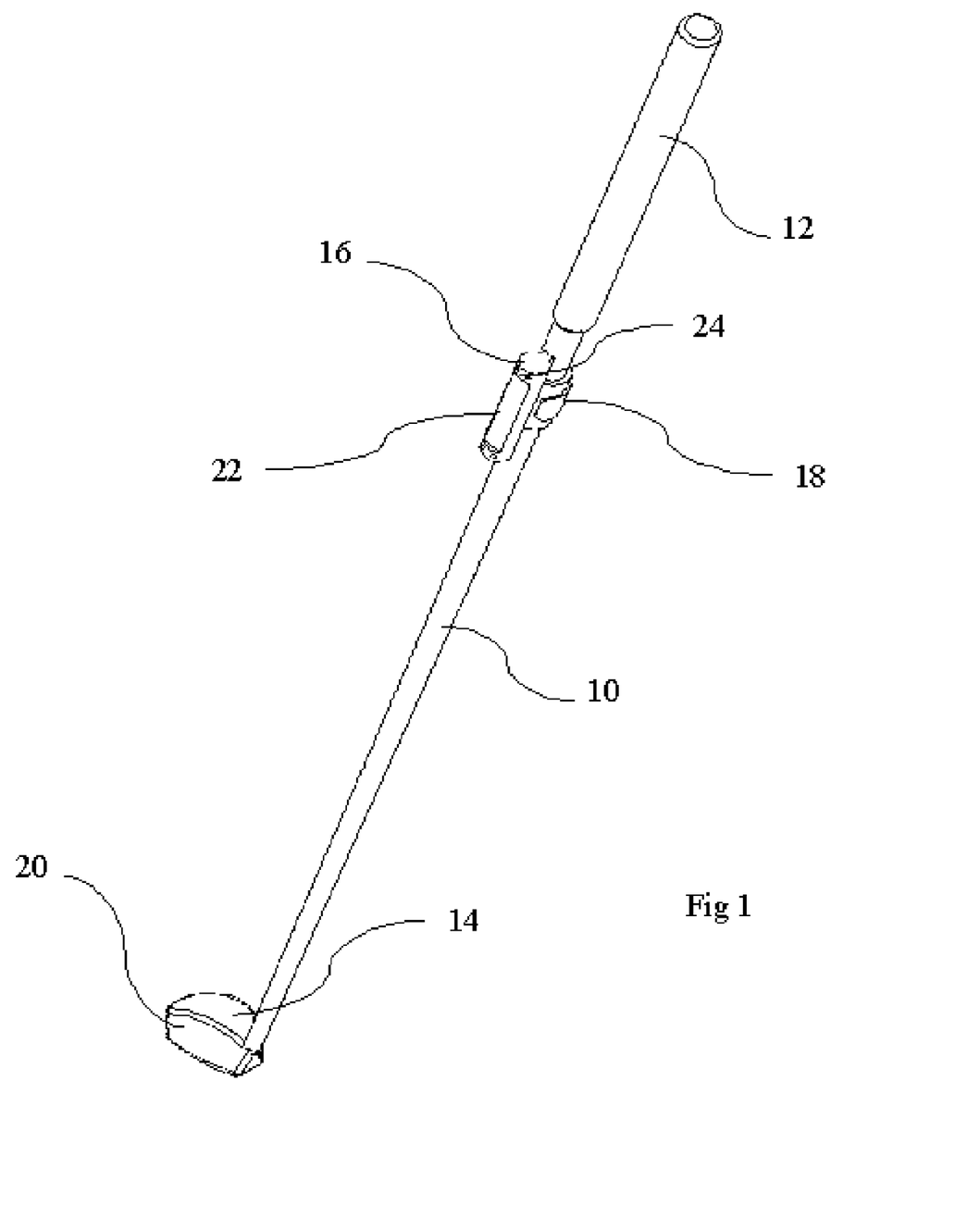
FIG. 1 shows a perspective view of a golf club (representing a swinging type piece of sporting equipment) with the portable swing analyzer attached.
Figure 2:
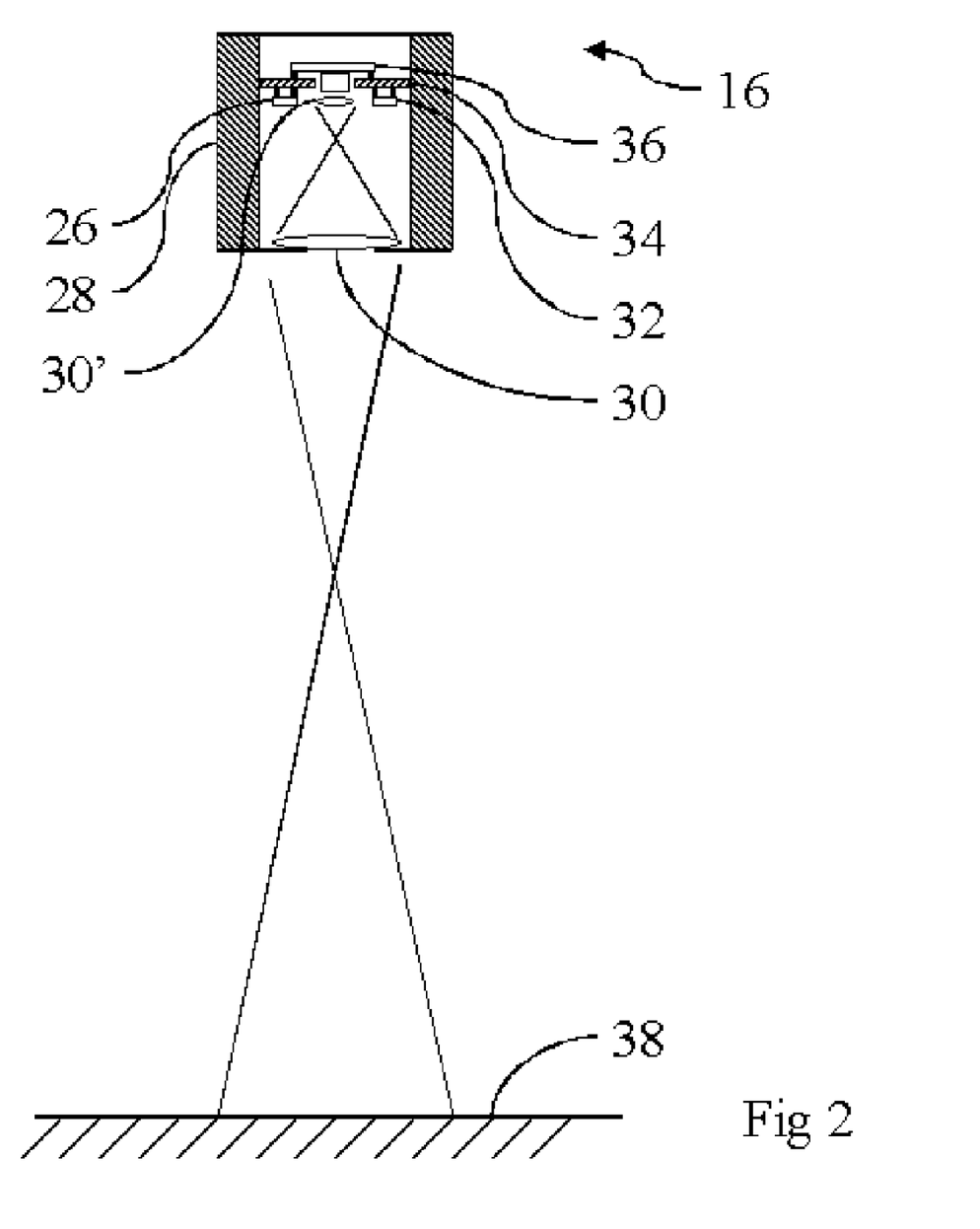
FIG. 2 shows a cross sectional view of the inside of the swing analyzer.
Figure 3:
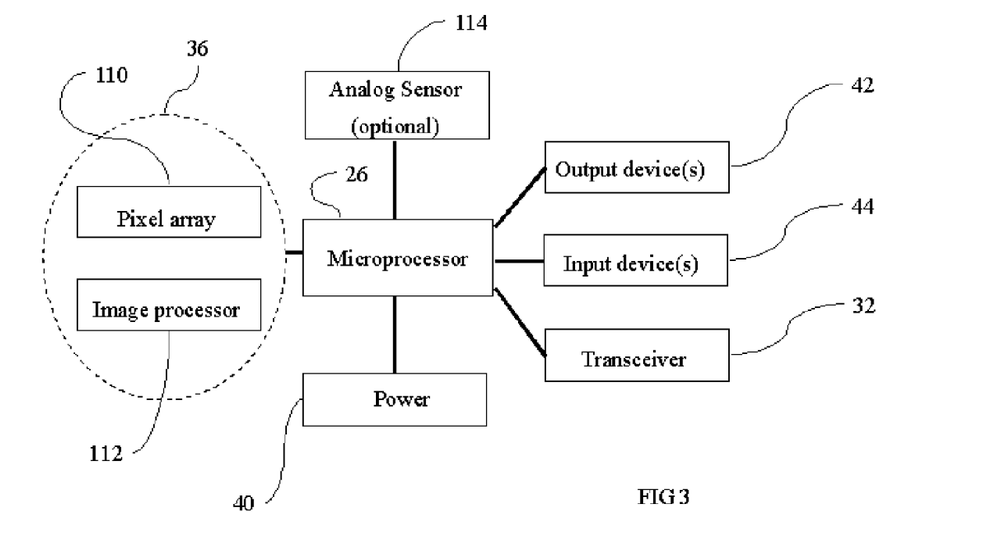
FIG. 3 shows the electrical block diagram of the portable swing analyzer.

DETAILED DESCRIPTION—FIG. 1, 2, AND 3 PREFERRED EMBODIMENTS

The following embodiments refer to systems and methods for measuring the motion of a golf club during a golf swing, however, persons skilled in the art will readily appreciate how the systems and methods discussed herein can be applied to other pieces of sporting equipment such as tennis rackets, baseball bats, hockey sticks, and the like.

A preferred embodiment of the swing analyzer of the present invention is illustrated in FIG. 1. A portable swing analyzer 16 is attached to a golf club shaft 10 by means of an attachment mechanism 18. Golf club shaft 10 is connected to a club head 14 having a clubface 20. Golf club shaft 10 has a grip 12. Portable swing analyzer 16 is attached to shaft 10 just below grip 12 pointing in the direction of clubface 20. While the club shown is a driver, the portable swing analyzer could equally be used with an iron, wedge, putter, etc.

In the preferred embodiment, attachment mechanism 18 is a toggle clamp similar to that of a ski boot buckle. One skilled in the art, however, will be able to conceive of a plethora of rapid attachment system including two part systems where one part is permanently attached to the golf club shaft. Attachment mechanism 18 holds portable swing analyzer 16 rigidly in place during the swing.

In the preferred embodiment an LCD display 22 is located in the longitudinal direction in portable swing analyzer 16, opposite attachment mechanism 18. It provides the function of output device. A series of input buttons 24 on either side of LCD display 22 provide the function of input device. One skilled in the art could conceive of numerous other types and arrangements of input and output devices including locating the input/output functions on a separate device, such as a watch, linking the portable swing analyzer to the separate input/output device through a wireless link, using voice commands as input and computer generated voice as output, using heads-up goggles for the output, using a pressure sensitive grip as an input, etc.

FIG. 2 shows the preferred embodiment of the internal construction of the swing analyzer. The swing analyzer contains a printed circuit board 34 to which is mounted an imaging sensor 36, a microprocessor 26 and a transceiver 32. In the preferred embodiment, the imaging sensor 36 is an Agilent ADNS-3060.

The ADNS-3060 is a high volume fully digital single chip sensor system used in optical computer mice. Because of the very large volumes and simple construction it has a very economical price point relative to much lower volume and much more complex analog/digital sensors like accelerometers, gyroscopes, and angular velocity sensors. Today, optical sensors have nearly two orders of magnitude cost advantage over a gyroscope-based sensor.

In the preferred embodiment, microprocessor 26 is a PIC-Micro® 18F2525 from Microchip, and the transceiver is bluetooth compatible. One skilled in the art could conceive of numerous other component combinations that would perform the same functions.

In the preferred embodiment, a set of imaging lenses 30 and 30' focus the image of a surface 38, where the ball lies, onto the focal plane of optical imaging sensor 36. The field of view (the size of the image that is focused onto the focal plane of the imaging sensor) depends on the type and speed of imaging sensor. In the preferred embodiment, using the Agilent ADNS-3060, the currently preferred field of view is 3 cm×3 cm. This field of view is capable of detecting a club head speed of 250 km/hr while maintaining a resolution of 2 km/hr. In the preferred embodiment, a depth of field of 20 cm is used in order to cover a reasonable range of club sizes. Other fields of view and depths of field could be used to fine-tune the swing analyzer to different types of sporting equipment. One skilled in the art of optical design will be able to easily choose an appropriate set of lenses to focus the image while providing the correct field of vision and depth of field.

In the preferred embodiment the assembly is protected by a waterproof housing 28.

In golf, the ball lies on surface 38, which is imaged, however with the correct choice of optical components, the surface could also be the background landscape in tennis and baseball.

FIG. 3 shows an electrical block diagram of the swing analyzer. In the preferred embodiment, optical imaging sensor 36 comprising a photo sensitive pixel array 110 and an image processor 112 is connected to microprocessor 26 via an SPI interface. An output device 42, which is an LCD display in the preferred embodiment, is connected to microprocessor 26 via a parallel interface. An input device 44, which is a series of pushbuttons in the preferred embodiment, is connected to the microprocessor 26 via individual microprocessor input-pins. Transceiver 32 is connected to microprocessor 26 via an SPI interface. A power supply 40, which is a conventional battery in the preferred embodiment, powers the components. An optional analog sensor 114, such as an accelerometer, gyroscope, angular velocity sensor, or range finder is connected to the CPU via an analog or digital interface. One skilled in the art could conceive of numerous other configurations, interfaces, components, input devices, output devices, power supplies, etc. that could perform similar functions.

OPERATION—FIGS. 4, 5, 6, 7, AND 8

Figures 4A, 4B:
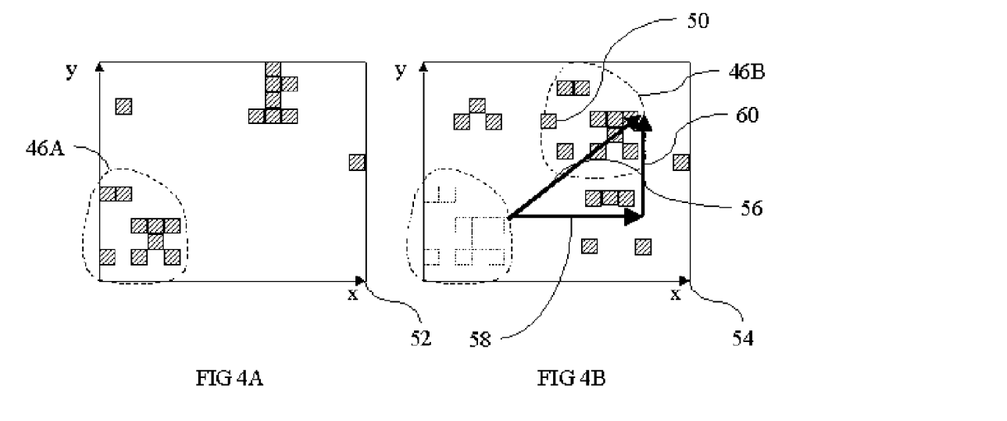
FIG. 4 shows two successive images taken by the imaging sensor.

FIG. 4 shows two sequential images taken by the imaging sensor and how patterns within the images are used to compute displacement. The imaging sensor (the Agilent ADNS 3060 in the preferred embodiment) performs the functions described here and outputs displacement values in the X-axis and Y-axis via an SPI interface. In order to detect movement using an imaging sensor and optical image recognition technology, sequential digital images are taken using the photo sensitive pixel array 110 (FIG. 3) as in a CMOS or CCD camera.

An image frame taken at time n 52 and consisting of a grayscale pixel pattern 46A is captured by the imaging sensor. In the preferred embodiment, a successive image frame is taken at time n+q 54 where q is of the order of 100 uS. The image processor 112 (FIG. 3) incorporating software algorithms and a hardware state-machine internal to and provided with the imaging sensor detect a substantially similar pixel pattern 46B in successive image frame 54. An anomaly pixel 50 can be detected and ignored. The software algorithms and the state machine calculate a displacement vector 56 consisting of an X component of the displacement vector 58 and a Y component of the displacement vector 60 which represent the displacement of image frame taken at time n+q 54 relative to image frame taken at time n 52 in terms of pixels.

While the preferred embodiment uses an imaging sensor which combines the functions of image capture and image processing such that X and Y displacement coordinates are output via SPI, ready to use, one skilled in the art would be capable of separating the functions of image capture and image treatment into two or more components which provide the means of taking sequential images, identifying a common pattern between sequential images, and calculating a displacement vector representing the displacement between the two images.

As imaging sensor 36 is mounted on moving club shaft 10 (FIG. 1) and focused on surface 38 (FIG. 2) that the club swings above, it perceives the relative movement of the surface. The actual movement of club head 14, when it is close to surface 38, is calculated as the vector with the same magnitude as that detected by image sensor 36 but pointed 180 degrees from the vector detected by image sensor 36.

Figure 8:
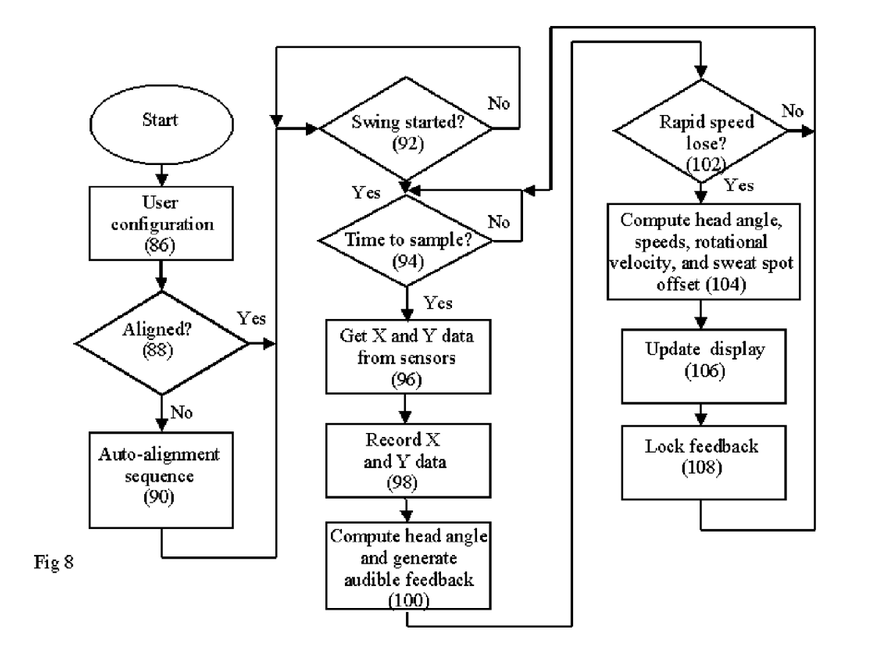
FIG. 8 shows a flowchart for the firmware in the microprocessor

FIG. 8 shows the firmware flowchart. A subroutine represented by the decision structure 94 is an interrupt driven control routine triggered every 100 uS in the preferred embodiment. This interrupt driven trigger precisely controls when the imaging sensor data is transferred from imaging sensor 36 to microprocessor 26. A sensor sampling subroutine 96 manages the SPI interface between microprocessor 26 and imaging sensor 36. One skilled in the art will be able to write these subroutines such that the time between the interrupt driven trigger and the SPI transfer are always exactly the same to prevent errors in X and Y value data collection.

Figure 5:
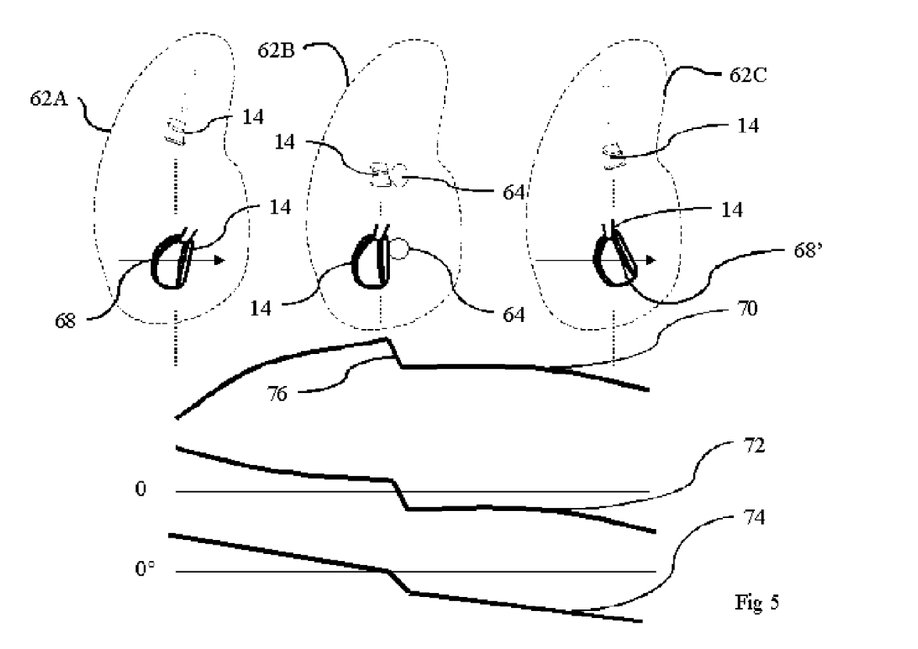
FIG. 5 shows the portable swing analyzer in use.

FIG. 5 shows the portable swing analyzer in use and demonstrates how the portable swing analyzer detects the movement of the golf club head 14 relative to a ball 64 and a direction of motion of the club head 68. Golf club head 14 is shown in three positions. 62A shows a top and front view of lower club and clubface just before impact, 62B shows a top and front view of lower club and clubface during impact and 62C shows a top and front view of lower club and clubface just after impact. A graph of club head speed perpendicular to club face 70 (from here on referred to as the Y direction) and a graph of club head speed parallel to club face 72 (from here on referred to as the X direction) are shown in relationship to the club head from just before impact 62A to just after impact 62C.

From the X and Y motion data collected by the imaging sensor and aligned with the golf club face 20 (FIG. 1) the following characteristics can be determined: the point in time when club face 20 contacts the ball 64 (FIG. 5), the angle of the club face 20 (FIG. 1) relative to the direction of motion of the club head 68 (FIG. 5) at the moment of contact, the club head speed at the moment of contact, the impact point of the ball vs. the sweat spot of the club, the rotational movement of the club head during impact, the speed of the club head 14, the momentum transferred from club head 14 to ball 64 and the initial ball speed. The methods involved in determining these characteristics will now be presented and are represented as a firmware subroutine 100 and a firmware subroutine 104 in FIG. 8.

To determine the point in time when club head 14 (FIG. 5) is in contact with ball 64, one finds a rapid drop in speed 76 in graph of club head speed 70 (also represented as a firmware subroutine in decision structure 102 in FIG. 8). This rapid drop in speed 76 occurs when club head 14 contacts golf ball 64 and transfers some of its momentum to the ball. This drop in speed 76 is of the order of magnitude of 10% of total speed over a 100 uS time period. One skilled in the art will have no difficulties writing firmware to sample at 100 uS time periods and detect a discontinuous drop in speed between two successive samples.

Figure 6:
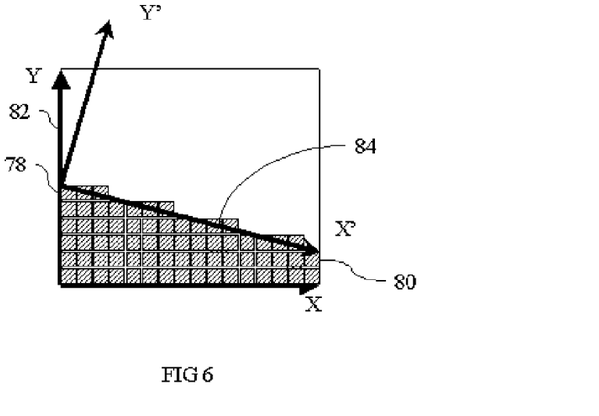
FIG. 6 shows the alignment of the sensor coordinate system with the clubface.

The measurement of the angle of club head 14 relative to the arc of the swing requires either an alignment between a coordinate system of the image sensor 82 (FIG. 6) and clubface 20 (FIG. 1) or an offset calculation between the two. In one preferred embodiment, the firmware in the portable swing analyzer has a firmware auto-alignment subroutine 90 (FIG. 8) in which the imaging sensor takes a single image of the clubface while the club is resting on a smooth light surface. FIG. 6 shows the alignment of the sensor coordinate system with the clubface as seen in a single image taken by the imaging sensor. The image sensor coordinate system 82 is shown offset from a clubface coordinate system 84. The clubface can be clearly distinguished from a light background and the angular offset between the two coordinate systems can be calculated using trigonometry. A pixel representing the left side of the club face edge from the top 78 and a second pixel representing the right side of the club face edge from the top 80 define two points on the Y' axis of club head coordinate system 84. In this example the offset between the two coordinate systems can be calculated as the arc tan (4/16)=14 degrees. In firmware, one skilled in the art will be able to construct a program that will be able to distinguish between the club head and a light background by scanning the pixels in a single image one column at a time moving from one row to the next. The firmware looks at the gray scale value of each pixel and detects an edge when there is a large difference, which could be more than 20% between two adjacent pixels. In the preferred embodiment, the grayscale values range from 0 for white to 255 for black and the edge of the club is distinguished by a shift of greater than 50 grayscale levels between adjacent pixels.

In another preferred embodiment, the portable swing analyzer has an alignment function that uses the above method and displays the resulting angle between the two coordinate systems on LCD display 22 of portable swing analyzer 16, allowing the golfer to align the portable swing analyzer 16 with the club head 14 manually. Once alignment has been accomplished, a firmware alignment detection subroutine 88 (FIG. 8) regularly verifies that the alignment has not changed when it is capable of detecting clubface 20 clearly and warns the golfer if it appears that alignment has been lost.

Once the coordinate system of the image sensor has been aligned with clubface 20, the club face angle at the moment of impact can be calculated from the X and Y displacement data. A club face angle relative to the arc of swing graph 74 is just the angle of the displacement vector after having aligned imaging sensor 36 with clubface 20 or after having corrected for the difference in coordinate systems. The club face angle at the moment of impact is calculated from this graph just prior to the impact. One skilled in the art will have little difficulty implementing this in firmware.

In golf, the sweat spot of a club refers to the center of mass of the club head. When a ball is struck in the sweat spot of the club, the club head does not rotate and the maximum transfer of momentum between club head and ball occurs. The impact point of the ball vs. the club sweat spot is determined by computing what the club face angle should be just after contact by extrapolating from the club face angle just before contact and comparing that to the actual club face angle just after contact. If the extrapolated value matches the actual value, then the ball was hit in the sweat spot of the club head. If the club rotates in such a manner that the club face becomes more open then it is expected to be, then the ball was struck too close to the toe (outside) of the club face. If the reverse is true, the ball was struck too close to the heel (inside) of the clubface. Knowing the weight of the club and ball and the speed of the club head (calculations shown below) one can relate the difference between the actual club head angle and expected club head angle to the distance from the sweat spot that the club impacted the ball using basic dynamics and the principle of conservation of momentum.

The rotational movement of the club head 14 during impact is the first derivative of club head angle graph 76 just before the point of impact. One skilled in the art will have no difficulty implementing a first derivative function in firmware.

Once one has identified the moment of impact and aligned or corrected for the misalignment of the coordinate system of portable swing analyzer 16 and the club face 20, the club head speed is just the magnitude of the club head speed vector which is the square root of the sum of the speed in the X direction just prior to impact squared and the speed in the Y direction just prior to impact squared.

The momentum transferred from the club to the ball is the mass of the club head 14 times its velocity just before the impact less the mass of the club head 14 times its velocity just after the impact. The initial ball speed can also be calculated by dividing its initial momentum by its mass.

One can readily see that by optically detecting forward and lateral speed and calculating club face angle that one can diagnose numerous technique defects, notable:

- Does the club hit the ball in the sweat spot? If not, did the ball contact the club too close to the heel (club twists in such a manner that the face becomes more closed) or too close to the toe (club twists in such a manner that the face becomes more open)? A contact point problem reduces the transfer of momentum between the club head and ball, reducing the distance that the ball flies, reducing the golfers ability to predict the distance, and sometimes imparting an unexpected spin or unexpected initial trajectory.
- Is the club head perpendicular to the arc of the swing? Is it too open or is it too closed? Club head alignment with swing trajectory determines the spin on the ball and whether the shot is straight, a fade, a draw, a hook, or a slice.
- Does the club head have a rotational component of motion at the moment of contact? A rotational component at the moment of contact can lead to unexpected ball spin and unpredictable shot placement.

Using real-time feedback (visual, audio, or other system) the portable swing analyzer warns the golfer of common technique faults. For example, a tone could be used that varies with the angle between the clubface relative to the arc of the swing. When the clubface is perpendicular with the arc of the swing, there is no sound. In the preferred embodiment, the user can set a threshold for the acceptable margin on either side of perpendicular in the user configuration subroutine 86 of FIG. 8. For example, the user may set the "neutral" zone for plus or minus three degrees from perpendicular. In the preferred embodiment, if the clubface is outside the neutral zone the frequency of the tone increases by 200 Hz for every degree that the clubface is more open and decreases by 200 Hz for every degree the club is more closed. If the starting point is 4000 Hz, a clubface that is 7 degrees more open then perpendicular would be represented by a tone of 5400 Hz.

In the preferred embodiment, the user can select to "lock" the feedback at the moment of impact. A feedback lock routine 108 (FIG. 8) manages this function in firmware. As an example, if the club face starts 15 degrees more open than perpendicular, the initial frequency would be 7000 Hz, as the club is swung, the club face may rotate toward the neutral position. At the moment of impact it could be 4 degrees open and a tone of 4800 Hz would be heard and this tone would be constant for a specific period (5 or 10 seconds) after the impact with the ball. It is conceivable that certain golfers desire a clubface that is slightly open, say between 2 degrees and 4 degrees from perpendicular. The "neutral" zone could be set for 2 to 4 degrees and the golfer can then practice until the point of contact with the ball consistently gives no tone indicating that the clubface is in the desirable angle range set by the golfer.

One skilled in the art could conceive of numerous other methods for giving feedback including a change in tone volume, a change in tone pulsation, a visual indication with a series of lights or meter, or even a heads up goggle arrangement which provides the angle.

One skilled in the art could also conceive of numerous methods for giving feedback for the club head speed, offset from sweat spot, club rotation, etc. For example, the golfer could set a threshold for the desired club head speed in the portable swing analyzer and then be warned if the club head speed falls below the threshold at time of impact. Tones that change frequency similar to that for club face angle could be used to indicate how far and which direction the ball missed the sweat spot or which direction and what the angular velocity was of the club rotation. One could even conceive of a function that allows the golfer to set the distance he or she would like to hit the ball and using the principle of conservation of momentum and basic dynamics, the swing analyzer feedbacks if the stroke was too hard or too soft.

One skilled in the art could also conceive a method to convert key measurements (e.g. club head speed, club head angle, sweat spot offset, etc.) into computer-generated voice that gives the golfer quantitative measurements in human language form. It is even conceivable that the portable swing analyzer provide a golf "pro" feature that gives specific suggestions to solve certain types of problems.

Figure 7:
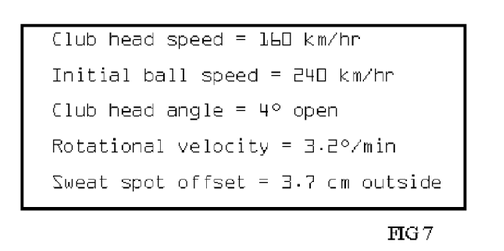
FIG. 7 shows the LED Display with details of the most recent stroke (represents a meaningful set of information).

FIG. 7 shows the LCD display with the details of the most recent stroke. All key measurements captured at the moment of impact are displayed on the LCD display.

FIG. 8 shows the firmware flowchart for microprocessor 26. The following subroutines have not yet been described: A swing input subroutine 92 detects a button press by the golfer that indicates that the golfer is preparing a swing. A recording subroutine 98 manages the interface between the microprocessor and memory, which could be located physically inside the microprocessor or as a separate component. An LCD display update routine 106 interfaces the microprocessor to the display. While the preferred embodiment uses an LCD display, any type of output device could be substituted.

Additional Embodiments

There are various possibilities with regard to the mounting location of portable swing analyzer 16. While the preferred embodiment positions portable swing analyzer 16 just under club grip 12 where the weight of the portable swing analyzer has little impact on the moment of inertia of the club head, the portable swing analyzer could also be located low on shaft 10, on the hosel, on club head 14 itself or even built into the club head 14.

In addition to relocating portable swing analyzer 16, a light guide (fiber optic, or other) could be used to separate the optical part of the portable swing analyzer from the image acquisition and processing part.

While the preferred embodiment uses the single imaging sensor 36, one skilled in the art could conceive of several configurations where adding more imaging sensors could be useful. For example, a second imaging sensor could be added that is specifically aligned, tuned, and focused to see only the golf ball, thus being able to measure the initial speed and direction of the ball directly. A second or third sensor could be added to capture motion in the Z direction to detect issues with Z height contact between club head 14 and ball 64.

Improvements to the portable swing analyzer could be made by adding auto focus and range finding capabilities to the optical system. An auto focus system could provide a greater depth of field and clearer image. When combined with range finding, the actual radius of the arc of the swing could be measured. Range finding is also useful to determine the contact point in tennis and baseball.

One skilled in the art could also conceive of numerous possibilities for combining the capabilities of the portable swing analyzer based on image recognition with other types of sensors such as gyroscopes, accelerometers, angular rate sensors, humidity sensors, or temperature sensors. These sensors may be located in the same housing as the optical system, or the sensors may be located on other parts of the club or even on the golfer to detect body position or swing mechanics.

One skilled in the art could also conceive of a portable swing analyzer based on image recognition that uses other than natural light. For example, the system could work equally well using natural light or incorporating a lighting system into the portable swing analyzer. The lighting system could be visible, UV or IR light. In addition the system could use naturally available non-visible light such as UV or IR. Laser light could also be used as a light source. Laser light has the advantage of being coherent and thus creating clearer images for the image sensor.

While the preferred embodiment uses an imaging sensor that detects grayscale images a color-imaging sensor could also be used.

The imaging sensor itself can be used as a range finder when one uses standard size balls as in golf, baseball, and tennis. If one knows the actual size of the ball, the radius of the ball in the image can be used to calculate the distance between the image plane in the sensor and the ball using basic trigonometry.

Advantages

From the description above, a number of advantages of the portable swing analyzer become evident:

The portable swing analyzer provides all the functionality of an expensive external swing analyzer, but in a small, portable, and lightweight package that can be used for improving technique in golf, tennis, baseball, hockey or similar sport.

The portable swing analyzer is sufficiently fast to capture the moment of contact between the club, racquet, bat or stick and the ball or puck while maintaining an economically low price.

The portable swing analyzer has a rapid attachment mechanism and self-alignment capability that allows it to be moved from one piece of sporting equipment to another instantly and without a realignment process.

The portable swing analyzer provides performance enhancement real-time feedback to aid the athlete make desired technique improvements and records all data for later analysis.

Conclusion, Ramifications, and Scope

Accordingly, the reader will see that the portable swing analyzer of this invention can analyze, record, and feedback performance enhancing information to athletes in golf, tennis, baseball, hockey, etc. Unlike external systems, the portable swing analyzer can be used anywhere. Unlike visual aids, the portable swing analyzer provides in-depth quantitative data. Unlike systems based on accelerometers or gyroscopes, the system is fast, economical to manufacture, and self-aligning.

Although the description above contains many specificities, these should not be construed as limiting the scope of the invention but as merely providing illustrations of some of the presently preferred embodiments of this invention. For example, the portable swing analyzer could be mounted in numerous other locations with multiple types of mounting systems, the optics many be separated from the rest of the system by means of fiber optic or other image relaying mechanism, multiple sensors could be added to add a third dimension or measure other elements of the swing mechanics, etc.

Thus the scope of the invention should be determined by the appended claims and their legal equivalents, rather than by the examples given.

What is claimed is:

1. An apparatus for measuring the motion of a swinging type piece of sporting equipment comprising:
    (a) a means of taking sequential images attached to said swinging type piece of sporting equipment, the sequential images being of a background element that does not move with the sporting equipment;
    (b) a means of identifying a common pattern between two sequential images and calculating a displacement vector from the movement of said common pattern in communication with said means of taking sequential images, said displacement vector representing the displacement of said common pattern between said sequential images;
    (c) a means of interpreting said displacement vector in communication with said means of calculating a displacement vector, the interpretation providing the user a meaningful set of information concerning the use of said sporting equipment; and
    (d) a means of communicating to user said meaningful set of information concerning the use of said sporting equipment, in communication with said means of interpretation;
    whereby the user may analyze their performance in the use of said sporting equipment.

2. The apparatus in claim 1 wherein the means of communicating to user occurs in real time using one or more feedback vehicles selected from the group consisting of audible feedback and visual feedback.

3. The apparatus in claim 1 wherein said piece of sporting equipment is a golf club.

4. The apparatus in claim 1 further comprising one or more additional means of taking sequential images.

5. The apparatus in claim 1 further comprising one or more sensors selected from the group consisting of accelerometers, gyroscopes, range finders, and angular velocity detectors.

6. The apparatus in claim 1 further comprising a means of detecting the angle between a coordinate system of the sporting equipment and a coordinate system of the apparatus.

7. The apparatus in claim 6 further comprising a means of compensating for the angle between the coordinate systems.

8. An apparatus for measuring the motion of a swinging type piece of sporting equipment comprising:
    (a) a photosensitive pixel array attached to said swinging type piece of sporting equipment, said photosensitive pixel array capable of taking sequential images of a background element that does not move with said swinging type piece of sporting equipment;
    (b) an image processor in communication with said photosensitive pixel array, said image processor capable of identifying a common pattern between the sequential images and calculating a displacement vector which represents the displacement of said common pattern between said sequential images;
- (c) a computational device in communication with said image processor, said computational device capable of converting said displacement vector into a meaningful set of information concerning the use of said piece of swinging type sporting equipment; and
- (d) an output device in communication with said computational device, said output device capable of communicating to user said meaningful set of information concerning the use of said piece of swinging type sporting equipment;

whereby the user may analyze their performance in the use of said piece of swinging sporting equipment.

9. The apparatus in claim 8 wherein said output device provides real time feedback concerning the motion of said sporting equipment using one or more feedback vehicles selected from the group consisting of audible feedback and visual feedback.

10. The apparatus in claim 8 wherein said piece of sporting equipment is a golf club.

11. The apparatus in claim 8 further comprising one or more additional photosensitive pixel arrays.

12. The apparatus in claim 8 further comprising one or more sensors selected from the group consisting of accelerometers, gyroscopes, range finders, and angular velocity detectors.

13. The apparatus in claim 8 further comprising a means of detecting the angle between a coordinate system of the sporting equipment and a coordinate system of the apparatus.

14. The apparatus in claim 13 further comprising a means of compensating for the angle between the coordinate systems.

15. A method for measuring the motion of a swinging type piece of sporting equipment comprising:
- (a) taking sequential images of a background element that does not move with said swinging type piece of sporting equipment;
- (b) identifying a common pattern between the sequential images;
- (c) calculating a displacement vector which represents the displacement of said common pattern between said sequential images;
- (d) interpreting said displacement vector to provide the user a meaningful set of information concerning the use of said piece of swinging type sporting equipment; and
- (e) communicating to user said meaningful set of information concerning the use of said piece of swinging type sporting equipment;

whereby the user may analyze their performance in the use of said piece of swinging sporting equipment.

16. The method in claim 15 further comprising a method for providing real time feedback concerning the motion of said sporting equipment using one or more feedback vehicles selected from the group consisting of audible feedback and visual feedback.

17. The method in claim 15 wherein said piece of sporting equipment is a golf club.

18. The method in claim 15 wherein sequential images are taken from a plurality of vantage points.

19. The method in claim 15 further comprising a method of detecting the angle between a coordinate system of said sporting equipment and a coordinate system of said apparatus.

20. The method in claim 15 further comprising a method of compensating for the angle between the coordinate systems.

* * * * *